(12) United States Patent
Mori

(10) Patent No.: US 6,745,112 B2
(45) Date of Patent: Jun. 1, 2004

(54) METHOD OF ESTIMATING QUANTITIES THAT REPRESENT STATE OF VEHICLE

(75) Inventor: Atsushi Mori, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/289,691

(22) Filed: Nov. 6, 2002

(65) Prior Publication Data

US 2003/0093190 A1 May 15, 2003

(30) Foreign Application Priority Data

Nov. 15, 2001 (JP) ........................................ 2001-350698

(51) Int. Cl.[7] ................................................. C06F 7/00
(52) U.S. Cl. ............................... 701/1; 701/36; 701/72; 701/82; 180/197
(58) Field of Search .............................. 701/1, 36, 37, 701/38, 71, 72, 73, 74, 82, 90; 180/197

(56) References Cited

U.S. PATENT DOCUMENTS 5,747,683 A * 5/1998 Gerum et al. ............... 73/118.1

FOREIGN PATENT DOCUMENTS

JP 11 78933 3/1999

OTHER PUBLICATIONS

2003/0089542– Mori –May 15, 2003– Method of estimating quantities that represent state of vehicle.*
2003/0130775– Lu et al.—Jul. 10, 2003– Vehicle side slip angle estimation using dynamic blending and considering vehicle attitude information.*

* cited by examiner

Primary Examiner—William A. Cuchlinski, Jr.
Assistant Examiner—Olga Hernandez
(74) Attorney, Agent, or Firm—Merchant & Gould P.C.

(57) ABSTRACT

The precision of the estimations of the vehicle body sideslip angle and the values related to the vehicle body sideslip angle can be improved by a simple and inexpensive method. The improved method of estimating quantities that represent the vehicle state of a vehicle comprises the steps of detecting a yaw rate and vehicle speed and calculating a vehicle body sideslip angle using three equations, which comprises an equation of equilibrium for the force in the lateral direction of the vehicle and an equation of equilibrium for the moment around a vertical axis of the vehicle, and an equation for the physical relationships of the quantities that represent the state of the vehicle movement, and which include a vehicle sideslip angle, a front wheel cornering power, and a rear wheel cornering power as unknown values.

9 Claims, 10 Drawing Sheets

FIG. 9A

First, the rear wheel cornering power $K_r$ input to the sideslip angle differential value computing unit 42 is calculated by using the predetermined initial value of the rear wheel cornering power $K_r$ input from the cornering power initial value input unit 41 and the regulating value input from the PID regulator 46. Moreover, in the first computation, the regulating value is zero. — 01

Next, the front wheel cornering power $K_f$ is calculated by equation 5 based on the results of detected quantities output from each of the sensors 11, 13, and 14, the physical quantities set in advance, and the like. — 02

Next, the vehicle body sideslip angle differential value $\beta'$ is calculated using equation 6. — 03

Then, the vehicle body sideslip angle $\beta$ is calculated by integrating with respect to time the vehicle body sideslip angle differential value $\beta'$, and this vehicle body sideslip angle differential value $\beta'$ is used in the calculation of the front wheel cornering power $K_f$ in the above step 02 and the calculation of the vehicle body sideslip angle differential value $\beta'$ in the next sequence of computing processing. — 04

Then, the estimated lateral acceleration $G_{ye}$ of the vehicle is calculated using equation 4 based on the vehicle body sideslip angle differential value $\beta'$, the yaw rate r of the vehicle detected by the yaw rate sensor 11, and the vehicle speed V detected by the vehicle speed sensor 13. — 05

Next, the deviation between the lateral acceleration $G_y$ input by the lateral acceleration sensor 12 and the estimated lateral acceleration $G_{ye}$ of the vehicle input from the lateral acceleration estimating unit 44 is calculated. — 06

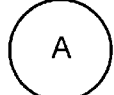

FIG. 9B

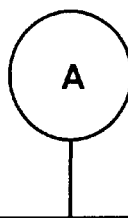

07

Then, due to the proportion, integration, differential (PID) operation, the regulating value of the predetermined initial value of the rear wheel cornering power $K_f$ is set so that the deviation between the lateral acceleration $G_y$ and the estimated lateral acceleration $G_{ye}$ of the vehicle is zero.

In addition, the rear wheel cornering power $K_r$ input into the sideslip angle differential value computing unit 42 is updated by the regulating value computed in step 07 and the predetermined initial value of the rear wheel cornering power $K_r$ input by the cornering power initial value input unit 41, the processing returns to the above step 02, and the processing of step 02 and after is executed, for example, after a predetermined time interval.

08

METHOD OF ESTIMATING QUANTITIES THAT REPRESENT STATE OF VEHICLE

BACKGROUND OF THE INVENTION

1. Field of the Invention

The present invention relates to a method for estimating quantities that represent the state of a vehicle, such as the vehicle body sideslip angle.

2. Description if the Related Art

Conventionally, control is known for improving the maneuverability of a vehicle by using the quantities that represent the vehicle state, such as the vehicle body sideslip angle β (that is, the angle formed between the forward direction of the vehicle and the longitudinal axis of the vehicle) when controlling the state of movement of the vehicle during a turning movement, for example. In this type of control, a method is known wherein, in the case that, for example, the vehicle body sideslip angle β is used, the yaw rate r detected by a yaw rate sensor (that is, the turn angle speed of the vehicle center of gravity around the axis in the vertical direction), the lateral acceleration $G_y$ detected by the lateral acceleration sensor (that is, the acceleration or deceleration added in the lateral direction of the vehicle), and the velocity V of the vehicle (vehicle speed) detected by the vehicle velocity sensor are substituted into the following equation 1, which is derived from the equation representing the physical relations of the quantities that represent the state of the movement of the vehicle, and by carrying out integration with respect to time, the vehicle body sideslip angle β is estimated.

However, in methods in which the results of the detected quantities from each of the sensors are integrated with respect to time, the influence of noise in each of the sensors, the error included in the results of the detected quantities, and the deviations in the calibrations of each of the sensors accumulate, and thus there is the concern that the precision of the estimation of the vehicle body sideslip angle β deteriorates.

$$\beta = \int \left( \frac{G_y}{V} - r \right) dt \qquad \text{Eq. 1}$$

In response to these problems, the method of estimating the vehicle body sideslip angle and estimating apparatus disclosed, for example, in Japanese Unexamined Patent Application, First Publication, No. Hei 11-78933, is known. In this method, models of a plurality of wheels are introduced, and the vehicle body sideslip angle β is estimated by switching the model for the wheels depending on, for example, the case that the coefficient of friction of the road surface changes or the various conditions during travel in the critical vicinity of movement of the vehicle (that is, the critical zone in which there is the possibility that the state of movement of the vehicle may become unstable when there is no control of any kind).

However, in the vehicle body sideslip angle estimation method and estimation apparatus according to the example of conventional technology described above, there are the problems that the computation processing of the vehicle body sideslip angle β becomes complicated, and that the computation load increases.

Furthermore, there are cases in which the estimated value of the vehicle body sideslip angle β drastically changes due to the timing during which the models of a plurality of wheels are switched, and thus the there is a concern that the drivability will deteriorate.

In consideration of the problems described above, it is an object of the present invention to provide a method of estimating the quantities representing the state of the vehicle that can improve the precision of the estimations of the vehicle body sideslip angle or values related to the vehicle body sideslip angle by a simple and inexpensive method.

SUMMARY OF THE INVENTION

In order to solve the problems and attain the objects described above, a first aspect of the method of estimating quantities that represent the state of the vehicle of the present invention comprises a step of detecting the yaw rate and vehicle speed (for example, step S 02 and step S 06 in the embodiment described below); and a step (for example, step S 02 to step S 03 in the embodiment described below) of calculating three equations which comprises an equation of equilibrium (for example, equation 2 in the embodiment described below) for the force in the lateral direction of the vehicle, an equation of equilibrium (for example, equation 3 in the embodiment described below) for the moment around the vertical axis of the vehicle, and an equation for the physical relationships of the quantities that represent the state of the vehicle movement (for example, equation 4 in the embodiment described below), using the vehicle body sideslip angle, the front wheel cornering power, and the rear wheel cornering power as unknown values.

According to the first aspect of the present invention, the method of estimating the quantities that represent the vehicle state described above, based on an equation of equilibrium for the force in the lateral direction of the vehicle, an equation of equilibrium for the moment around the vertical axis of the vehicle, and an equation for the physical relationships of the quantities that represent the state of the vehicle movement obtained from a predetermined model of the movement of the wheels that describes the yaw movement of the vehicle in, for example, a two wheel model, it is possible to derive simultaneous equations comprising the three unknown quantities of the vehicle body sideslip angle, the front wheel cornering power, or the rear wheel cornering power by setting detected values from each of the sensors to the yaw rate and the vehicle speed. That is, it is possible to estimate the vehicle sideslip angle using a simple method that limits increases in the computing load and has high precision by using the exact number of equations for the number of unknowns to be calculated.

The second aspect of the present invention provides a method of estimating quantities that represent the vehicle state comprises a step (for example, steps 02 and step S 06 in the embodiment described below) of detecting the yaw rate, the lateral acceleration, and the vehicle speed, a step (for example, step S 02 to step S 08 in the embodiment described below) of calculating the velocity of the vehicle in the lateral direction using three equations, an equation of equilibrium for the force in the lateral direction of the vehicle (for example, equation 15 in the embodiment described below), an equation of equilibrium for the moment around a vertical axis of the vehicle (for example, equation 16 in the embodiment described below), and an equation for the physical relationships of the quantities that represent the state of the vehicle movement, using the vehicle speed in the lateral direction, the front wheel cornering power, and the rear wheel cornering power as unknown values, and a step (for example, step S 04 in the embodiment described below) of calculating the vehicle body sideslip angle from the velocity of the vehicle in the lateral direction.

According to the second method of estimating the quantities that represent the state of a vehicle of the present invention, based on an equation of equilibrium for the force in the lateral direction of the vehicle, an equation of equilibrium for the moment around the vertical axis of the vehicle, and an equation for the physical relationships of the quantities that represent the state of the vehicle movement obtained from a predetermined movement model of vehicles that describes the yaw movement of the vehicle in, for example, a two wheel model, it is possible to derive simultaneous equations comprising three unknown quantities that represent the speed of the vehicle in the lateral direction, the front wheel cornering power, and the rear wheel cornering power by setting detected values from each of the sensors to the yaw rate and the vehicle speed. Here, it is possible to estimate the vehicle body sideslip angle using a simple method that limits increases in the computation load while at the same time has a high precision because it is possible to calculate unambiguously the vehicle body sideslip angle from the velocity of the vehicle in the lateral direction and the vehicle speed.

A third aspect of the present invention provides a method of estimating the quantities that represent the state of a vehicle of the present invention comprises: a step (for example, steps 02 and step S 06 in the embodiment described below) of detecting the yaw rate, the lateral acceleration, and the vehicle speed, and a step (for example, step S 02 to step S 08 in the embodiment described below) of calculating the vehicle body sideslip angle using three equations comprising an equation of equilibrium for the force in the lateral direction of the vehicle (for example, equation 13 in the embodiment described below), an equation of equilibrium for the moment around a vertical axis of the vehicle (for example, equation 12 in the embodiment described below), and an equation for the physical relationship of the quantities that represent the state of the vehicle movement (for example, equation 4 in the embodiment described below), using the vehicle body sideslip angle, the front wheel tires lateral force, and the rear wheel tire lateral force as unknowns values.

According to the third method of estimating the quantities that represent the state of a vehicle of the present invention, based on an equation of equilibrium for the force in the lateral direction of the vehicle, an equation of equilibrium for the moment around the vertical axis of the vehicle, and an equation for the physical relationships of the quantities that represent the state of the vehicle movement obtained from a predetermined movement model of vehicles that describes the yaw movement of the vehicle in, for example, a two wheel model, it is possible to derive simultaneous equations comprising the three unknown quantities that represent the vehicle body sideslip angle, the front wheel tires lateral force, and the rear wheel tires lateral force by setting detected values from each of the sensors to the yaw rate, the lateral acceleration, and the vehicle speed. Here, it is possible to estimate the vehicle body sideslip angle using a simple method that limits increases in the computation load while at the same time has a high precision.

The fourth aspect of the present invention provides a method of estimating the quantities that represent the state of a vehicle of the present invention comprises: a step (for example, step S 02 and S 06 in the embodiment described below) of detecting the yaw rate (for example, the yaw rate r in the embodiment described below), the lateral acceleration (for example, the lateral acceleration $G_y$ in the embodiment described below), and the vehicle speed (for example, the vehicle speed V in the embodiment described below), and a step (for example, step S 02 to step S 08 in the embodiment described below) of calculating the values related to the vehicle sideslip angle using three equations, the equation of equilibrium for the force in the lateral direction of the vehicle (for example, equation 2, equation 11, and equation 15 in the embodiment described below), the equation for equilibrium of the moment of the vehicle around a vertical axis (for example, equation 3, equation 12, or equation 16 in the embodiment described below), and an equation for the physical relationships between the quantities that represent the state of the vehicle movement (for example, equation 4 and equation 19 in the embodiment described below), having as unknowns values related to the vehicle body sideslip angle (for example the vehicle body sideslip angle β or the $V_y$ component of the vehicle speed V in the lateral direction in the embodiment described below), the variables that determine the characteristics of the front wheel tires (for example, the front wheel cornering power $K_f$ and coefficient of friction $\mu$ in the embodiment described below), and the variables that determine the characteristics of the rear wheels (for example, the rear wheel cornering power $K_r$ and the coefficient of friction $\mu$ in the embodiment described below).

According to the fourth method of estimating the quantities that represent the state of a vehicle based on three equations, equation of equilibrium for the force in the lateral direction of the vehicle, an equation of equilibrium for the moment around the vertical axis of the vehicle, and an equation for the physical relationships of the quantities that represent the state of the vehicle movement, obtained from a predetermined movement model of vehicles that describes the yaw movement of the vehicle in, for example, a two wheel model, it is possible to derive simultaneous equations comprising the three unknown quantities that represent the values related to the vehicle body sideslip angle, the variables that determine the characteristics of the front wheel tires, and the variables that determine the characteristics of the rear wheel tires by setting detected values from each of the sensors to the yaw rate, the lateral acceleration, and the vehicle speed. That is, it is possible to estimate the values related to the vehicle body sideslip angle using a simple method that limits increases in the computation load while at the same time has a high precision by using only the exact number of equations necessary for the number of unknowns to be calculated.

The fifth aspect of the present invention provides a method of estimating the quantities that represent the state of the vehicle comprises: a step (for example, step S 05 in the embodiment described below) of calculating the differential values (for example, the vehicle body sideslip angle differential value β' and the differential value $V_{y'}$ in the embodiment described below) of the values related to said vehicle sideslip angle based on said yaw rate and said vehicle speed, and a step (for example, step S 06 in the embodiment described below) of testing the differential value of the values related to said vehicle body sideslip angle by said lateral speed.

According to the fifth method of estimating the quantities that represent the state of a vehicle described above calculates the differential values of the values related to the vehicle body sideslip angle by substituting the detected values of the yaw rate and the vehicle speed input from each of the sensors into two equations comprising the equation of equilibrium for the force of a vehicle in the lateral direction and the equation of equilibrium for the moment around a vertical axis of the vehicle.

In addition, based on the differential values of the values related to the calculated vehicle body sideslip angle, the estimated value of the lateral acceleration is calculated by the equation representing the physical relationships of the quantities that represent the vehicle movement, and by comparing this estimated value with the detected value of the lateral acceleration output, for example, by sensors or the like, the differential values of the values related to the vehicle sidestep angle.

In this case, compared to the case of comparing the physical quantities calculated based on the vehicle body sideslip angle obtained by integrating with respect to time the differential value of the values related to the vehicle body sideslip angle, it is possible to prevent errors from accumulating due to the integration computations of variables that are the object of testing, and the testing can be executed with a high precision.

The sixth aspect of the method of estimating the quantities that represent the state of a vehicle of the present invention comprises: a step (for example, step S 04 in the embodiment described below) of calculating the values related to said vehicle body sideslip angle by integrating the differential values of said values related to the vehicle body sideslip angle, and a step (for example, step S 03 in the embodiment described below) of calculating the differential values of the said values related to the vehicle sideslip angle in the present processing by using said values related to the vehicle sideslip angle calculated in the previous processing.

According to the sixth method of estimating the quantities that represent the state of a vehicle described above, when calculating the differential values of the values related to the vehicle body sideslip angle, by using the values related to the vehicle body sideslip angle calculated in the previous processing, recursive calculation processing is carried out, and thereby it is possible to prevent the values related to the vehicle body sideslip angle obtained by integrating with respect to time the differential values of the values related to the vehicle body sideslip angle from diverging.

That is, by repeating the recursive processing, the values related to the vehicle body sideslip angle converge, and thus drastic fluctuations in the estimated values of the values related to the vehicle body sideslip angle can be avoided, and the stability of the vehicle behavior control can be guaranteed.

In addition, the seventh aspect of the method of estimating the quantities that represent the state of a vehicle comprises the step (for example, step S 01) in the embodiment described below) of eliminating either said variables that determine the characteristics of the front wheel tires or said variables that determine the characteristics of the rear wheel tires from said equation of equilibrium for the force in the lateral direction of the vehicle and said equation of equilibrium for the moment around a vertical axis of the vehicle.

According to the seventh method of estimating the quantities that represent the state of a vehicle, an equation is calculated from which either the variables that determine the characteristics of the front wheel tires or the variables that determine the characteristics of the rear wheel tires have been eliminated from the equation of equilibrium for the force in the lateral direction of the vehicle and the equation of equilibrium for the moment around a vertical axis of the vehicle. In addition, the differential values of the values related to the vehicle sideslip angle are calculated based on an equation obtained by solving this equation for the differential values of the values related to the vehicle body sideslip angle.

In this case, by estimating the values related to the vehicle body sideslip angle and either the variables that determine the characteristics of the front wheel tires or the variables that determine the characteristics of the rear wheel tires, in comparison to the case of estimating, for example, three unknowns, the computing load can be decreased.

Furthermore, the eighth aspect of the method for estimating the quantities representing the state of a vehicle comprises: a step (for example, step S 01 to step S 03 in the embodiment described below) of calculating the differential values of said values related to the vehicle body sideslip angle by providing initial values to either said variables that determine the characteristics of the front wheel tires or said variables that determine the characteristics of the rear wheel tires, whichever has not been eliminated, a step (for example, step S 05 in the embodiment described below) of calculating the lateral acceleration (for example the estimated lateral acceleration $G_{ye}$ of the vehicle) from an equation that represents the physical relationships of the of said state of the vehicle movement using the differential values of said values related to the vehicle sideslip angle, and a step (for example, step S 08 in the embodiment described below) that updates said initial values based on the results of comparing said calculated lateral acceleration and said detected lateral acceleration.

According to the eighth method of estimating the quantities that represent the state of a vehicle described above, depending on the results of comparing the estimated value of the lateral acceleration calculated based on the differential values of the values related to the vehicle body sideslip angle in the previous processing and the detected value of the lateral acceleration input by sensors, either the variables that determine the characteristics of the front wheel tires or the variables that determine the characteristics of the rear wheel tires, which are input when calculating the differential values of the values related to the vehicle body sideslip angle in the present processing, are updated. Thereby, depending, for example, on the changes in the road surface or the like, even in the case that the variables that determine the characteristics of the front wheel tires or the variables that determine the characteristics of the rear wheel tires fluctuate drastically, it is possible to suitably calculate the differential values of the values related to the vehicle body sideslip angle.

BRIEF DESCRIPTION OF THE DRAWINGS

FIGS. 9A and 9B are together a flow chart illustrating operation of the vehicle control system in terms of explaining a process in which vehicle body sideslip angle β is estimated as the quantity that represents the state of the vehicle.

DESCRIPTION OF THE EMBODIMENT

Below, the method of estimation quantities that represent the vehicle state according to an embodiment of the present invention will be explained with reference to the drawings.

Figure 1:
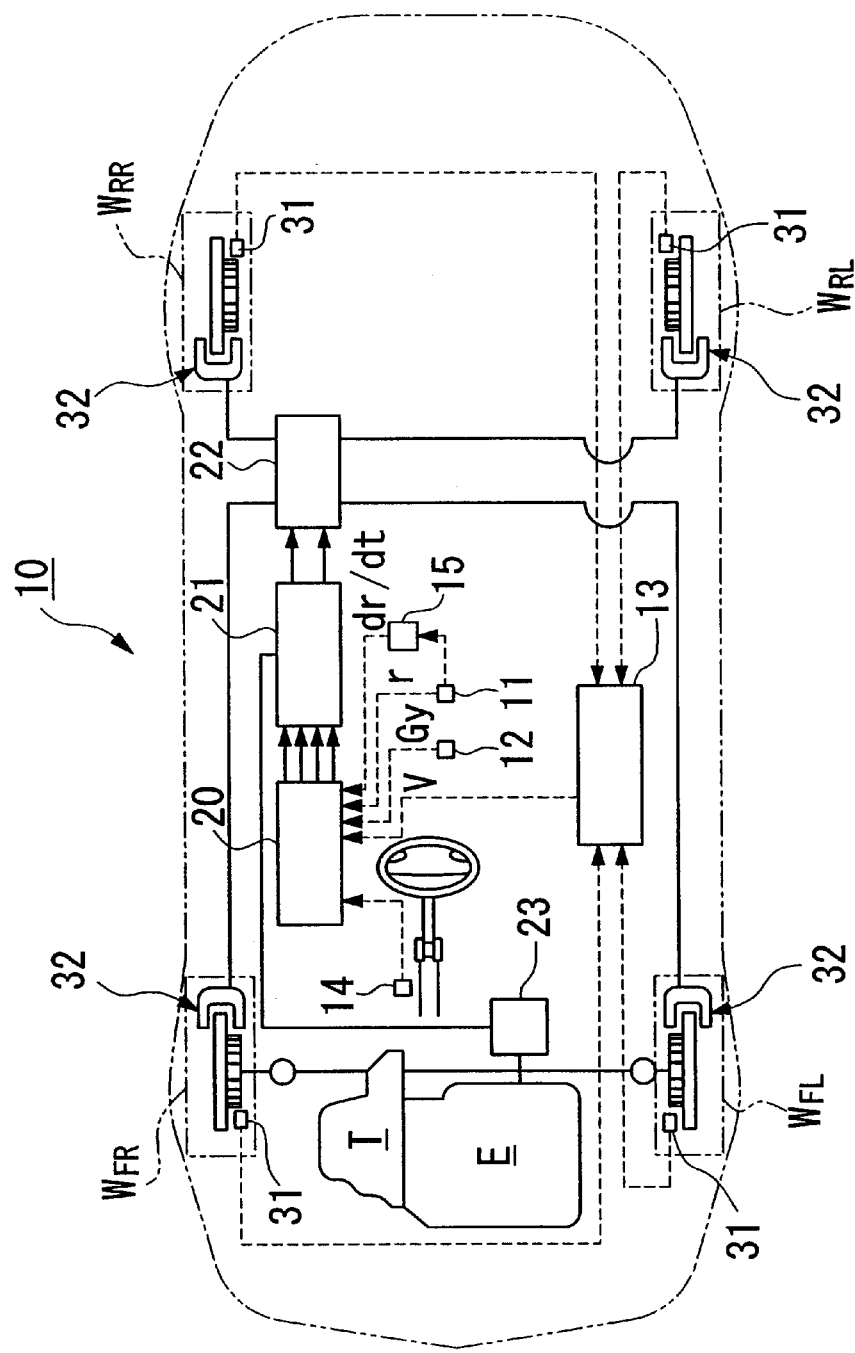
FIG. 1 is a structural diagram of the vehicle control system that realizes the method of estimating the quantities that represent the state of the vehicle according to an embodiment of the present invention.
Figure 2:
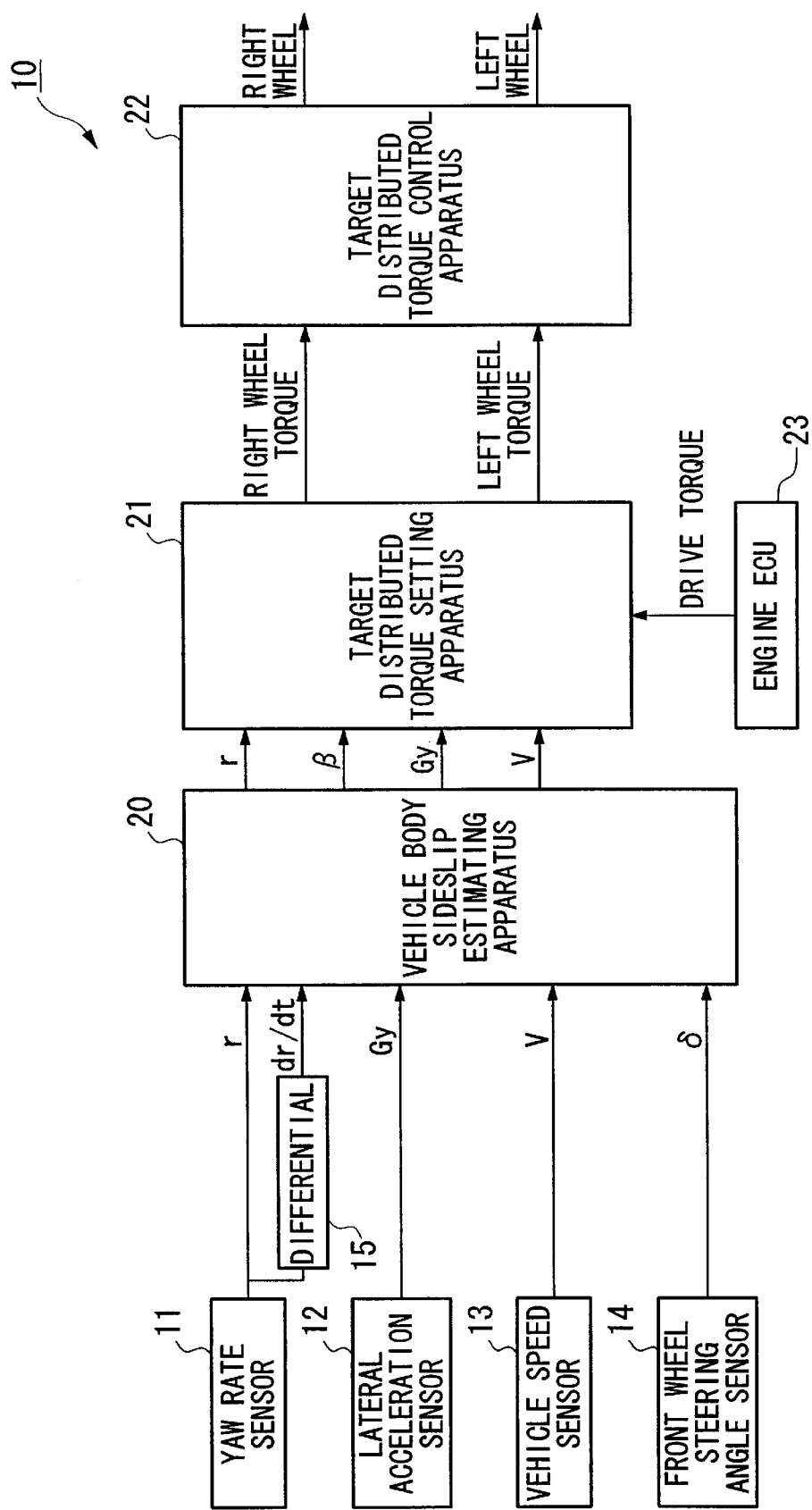
FIG. 2 is a structural diagram of the vehicle control system that realizes the method of estimating the quantities that represent the state of the vehicle according to an embodiment of the present invention.
Figure 3:
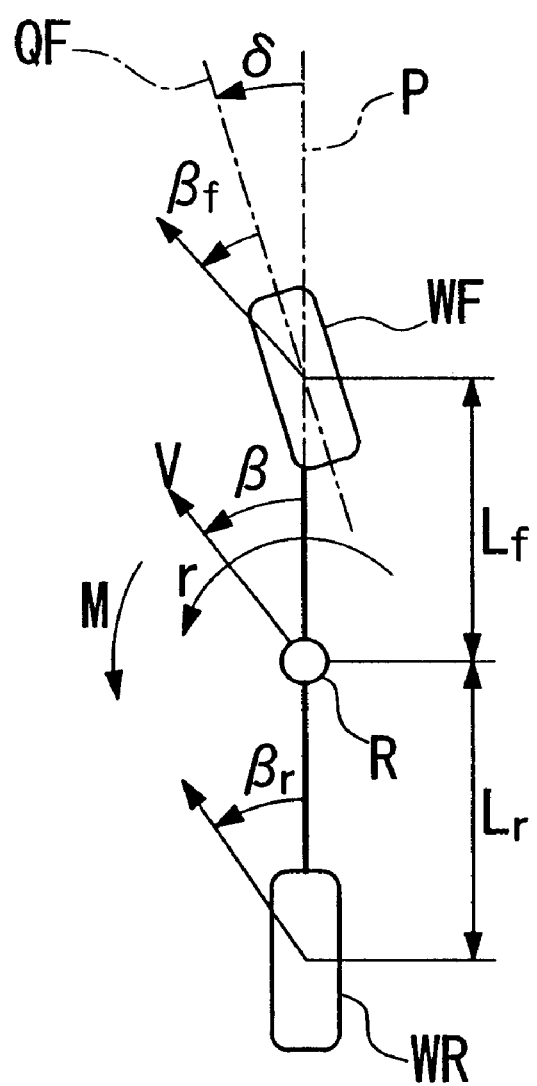
FIG. 3 is a schematic drawing showing the two wheels in the two-wheel model.
Figure 4:
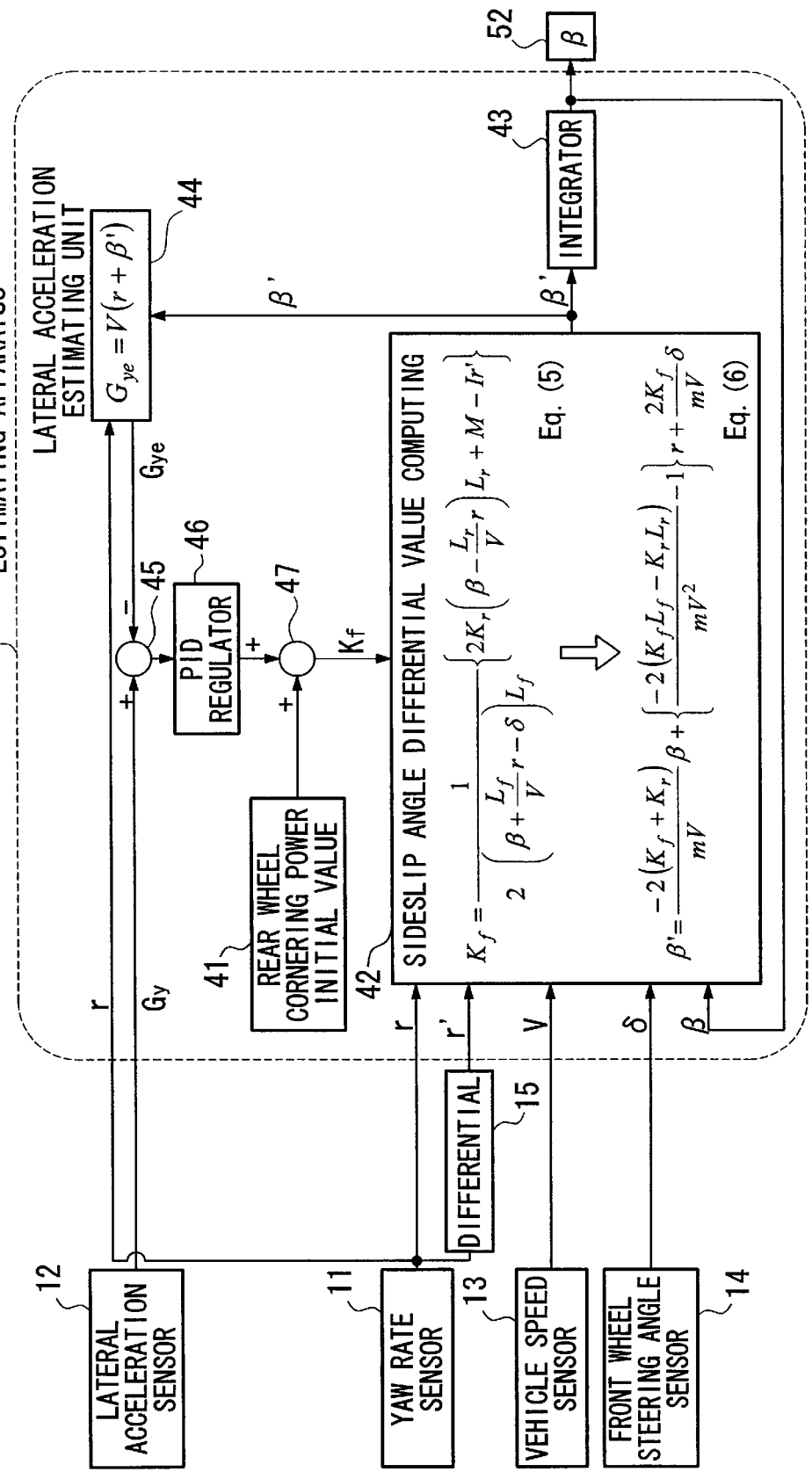
FIG. 4 is a block diagram showing an example of the flow of the processing in the vehicle body sideslip angle estimating apparatus shown in FIG. 1 and FIG. 2.

FIG. 1 and FIG. 2 are structural diagrams of the vehicle control system that realizes the method for estimating the quantities that represent the vehicle state according to an embodiment of the present invention; FIG. 3 is a schematic diagram showing a two wheel diagram in the two wheel model; FIG. 4 is a functional block diagram showing an example of the processing flow in the vehicle body sideslip angle estimating apparatus 20 shown in FIG. 1 and FIG. 2.

The vehicle control system 10 according to the present embodiment comprises, as shown for example in FIG. 1 and FIG. 2, a yaw rate sensor 11, a lateral acceleration sensor 12, a vehicle speed sensor 13, a front wheel steering angle sensor 14, a yaw rate differential value calculating unit 15, a vehicle body sideslip angle estimating apparatus 20, a target distributed torque setting apparatus 22, a target distributed torque control apparatus 21, and an engine ECU 23.

The yaw rate sensor 11 comprises a piezoelectric element, a gyro sensor, or the like, that detects the amount of the change in the angle of inclination with respect to the heading of the vehicle on a horizontal plane or a vertical direction, and a signal having a voltage level that depends on the size of the result of detecting the yaw rate r (that is, the turn angle speed of the vehicle center of gravity around the axis in the vertical direction) output to a yaw rate differential value calculating unit 15 and a vehicle body sideslip angle estimating apparatus 20.

The lateral acceleration sensor 12 detects the lateral acceleration $G_y$, which is the acceleration (or deceleration) added in the lateral direction of the vehicle, and outputs the signal having a voltage level that depends on the detected result to the vehicle body sideslip angle estimating apparatus 20.

The vehicle speed sensor 13 detects the velocity V of the vehicle (vehicle speed V) from the velocities of each of the vehicle wheels (that is, the turn angle velocities of each of the vehicle's wheels) by a plurality of vehicle wheel speed sensors 31, . . . , 31 provided on each of the vehicle wheels $W_{FR}$, $W_{FL}$, $W_{RR}$, $W_{RL}$, and outputs a signal having a voltage level that depends on the size of this detected result to the vehicle body sideslip angle estimating apparatus 20.

The front wheel steering angle sensor 14 comprises a rotary encoder or the like provided, for example, on the steering axle, and by subtracting the steering angle, comprising the direction and size of the steering angle input by the driver, from the steering gear ratio of the front wheel steering system, the front wheel steering angle δ (that is, the angle δ formed between the longitudinal axis P of the vehicle and the longitudinal direction QF of the front wheels) is detected, and a signal having a voltage level that depends on the size of the detected result is output to the vehicle body sideslip angle estimating apparatus 20.

The vehicle body sideslip estimating apparatus 20 estimates the vehicle body sideslip angle β (that is, the angle between the forward direction of the vehicle (for example, the direction of the vehicle speed V) and the longitudinal axis P of the vehicle) as a quantity that represents the vehicle state based on the following equations 2 and 3 according to the predetermined movement model of a vehicle (for example, the two wheel model), and outputs the estimated vehicle body sideslip angle β to the target distributed torque setting apparatus 21.

The target distributed torque setting apparatus 21 sets the target value of the distributed torque that is distributed over the right and left front and rear wheels of the vehicle based on the vehicle body sideslip angle β estimated by the vehicle body sideslip estimating apparatus 20, the yaw rate r of the vehicle detected by the yaw rate sensor 11, the lateral acceleration $G_y$ of the vehicle detected by the lateral acceleration sensor 12, the vehicle speed V detected by the vehicle speed sensor 13, and the drive torque calculated by the engine ECU 23, and outputs the calculated right wheel torque and left wheel torque to the target distributed torque control apparatus 22.

In addition, the target distributed torque control apparatus 22, for example, adds a driving force appropriate for each of the vehicle wheels $W_{FR}$, $W_{FL}$, $W_{RR}$, $W_{RL}$ or a desired yawing moment M by applying a damping force depending on the state of operation of the vehicle. For example, the target distributed torque control apparatus 22 may carry out control so that a plurality of brake devices 32, . . . , 32 provided on each of the wheels $W_{FR}$, $W_{FL}$, $W_{RR}$, $W_{RL}$ are actuated, and the actual value of the each of the torques of the left and right wheels is equal to each of the target values of the right wheel torque and the left wheel torque.

$$mV(r+\beta') = -2K_f\left(\beta + \frac{L_f}{V}r - \delta\right) - 2K_r\left(\beta - \frac{L_r}{V}r\right) \quad \text{Eq. 2}$$

$$Ir' = -2K_f\left(\beta + \frac{L_f}{V}r - \delta\right)L_f + 2K_r\left(\beta - \frac{L_r}{V}r\right)L_r + M \quad \text{Eq. 3}$$

$$G_{ye} = V(r+\beta') \quad \text{Eq. 4}$$

29

Here, among the movement models for the vehicle that describe the yaw movement of the vehicle, that is, the rotational movement of the center of gravity of the vehicle around the axis R in the vertical direction, as shown, for example, in FIG. 3, in a two wheel model in which it is assumed that the distance between the wheels of the vehicle is ignored, and the front and rear left and right wheels are respectively collapsed at the intersection between the longitudinal axis P of the vehicle and each of the vehicle axes, at the front wheels WF and the rear wheels WR, the lateral force and the cornering force are approximated to be equal, the cornering force is approximately proportional to the sideslip angles of and $\beta_f$ and $\beta_r$ of each tire, and furthermore, the vehicle body sideslip angle β is approximated to be sufficiently small (for example, sin β=β, cos β=1), thereby the above equation 2 is derived as an equation of equilibrium for the power of the vehicle lateral direction and the above equation 3 is derived as the equation of equilibrium for the moment of the vehicle around the axis in the vertical direction (the axis R in the vertical direction of the center of gravity).

In addition, the above equation 4 is derived as the equation for physical relationships of the quantities that represent the state of the movement of the vehicle (for example, the estimated lateral acceleration $G_{ye}$ of the vehicle).

Here, in the equations 2 and 3 described above, the physical quantities that can be directly detected are the vehicle speed V, the yaw rate r, and the yaw rate differential value dr/dt (that is, the integrated with respect to time value of the yaw rate r:r'), and the front wheel steering angle δ, and the fixed physical quantities of the vehicle are the total mass m of the vehicle, the distance $L_f$ from the center of gravity of the vehicle to the axle of the front wheel, the distance $L_r$ from the center of gravity of the vehicle to the axle of the rear wheel, and the yawing inertial moment I. When these values and the yawing moment M, which is already known, are treated as constants, equations 2 and 3 described above constitute a three variable simultaneous differential equation comprising the vehicle body sideslip angle β, the front wheel cornering power $K_f$, and the rear wheel cornering power $K_r$.

That is, each of the cornering powers $K_f$ and $K_r$ that are a proportion of the cornering force with respect to the sideslip $β_f$ and $β_r$ of each tire must be treated as variables because they change depending on the state of the turning movement of the vehicle and the state of the road surface (for example, a dry asphalt surface, a snow covered surface, or the like).

Thus, each of the detected signals of the yaw rate r of the vehicle detected by the yaw rate sensor 11, the yaw rate differential r' calculated by the yaw rate differential value calculation unit 15, the lateral acceleration $G_y$ detected by the lateral acceleration sensor 12, the vehicle speed V detected by the vehicle speed sensor 13, and the front wheel steering angle δ detected by the front wheel steering angle sensor 14 are input into the vehicle body sideslip angle estimating apparatus 20.

At this time, the vehicle body sideslip angle estimating apparatus 20 does not calculate the vehicle body sideslip angle β by integrating with respect to time the vehicle body sideslip angle differential value dβ/dt (that is, the time differential value of the sideslip angle β:β') in the above equation 4, as in, for example, the example of the conventional technology described above, but rather as will be described below, calculates the vehicle body sideslip angle β by integrating with respect to time the vehicle body sideslip angle differential value β' in the above equation 2.

As shown, for example, in FIG. 4, the vehicle body sideslip angle estimating apparatus 20 comprises the cornering power setting unit 41, the sideslip angle differential value computing unit 42, an integrator 43, a lateral acceleration estimating unit 44, a subtractor 45, a PID regulator 46, and an adder 47.

The cornering power initial value input unit 41 supplies to the sideslip angle differential value computing unit 42 via the adder 47 a predetermined initial value (for example, the initial value of the rear wheel cornering power $K_r$ shown in FIG. 4) for either the front wheel cornering power $K_f$ or the rear wheel cornering power $K_r$ depending on the computing processing of the sideslip angle differential value computing unit 42 described below.

The sideslip angle differential value computing unit 42 calculates the predetermined initial value for either the front wheel cornering power $K_f$ or the rear wheel cornering power $K_r$ input by the cornering power initial value input unit 41 and the vehicle body sideslip angle differential value β' based on the above equations 2 and 3.

Here, the sideslip angle differential value computing unit 42, for example, calculates front wheel cornering power $K_f$ by substituting the rear wheel cornering power $K_r$ input from the cornering power setting unit 41 and determined by the initial value of the rear wheel cornering power $K_r$ input from the cornering power initial value input unit 41 and the regulating value from the PID regulator described below; the constant vehicle speed V, the yaw rate r, the yaw rate differential value r', the front wheel steering angle δ, the distance $L_f$ from the center of gravity of the vehicle to the front wheel axle, the distance $L_r$ from the center of gravity of the vehicle to the rear wheel axle, the yawing inertial moment I, the yawing moment M; and the vehicle body sideslip angle β input from the integrator 43 described below into the following equation 5, which is an equation obtained by solving 3 to obtain the front wheel cornering power $K_f$. Moreover, in the first computation, the vehicle body sideslip angle β is zero.

$$K_f = \frac{1}{2\left(\beta + \frac{L_f}{V}r - \delta\right)L_f}\left\{2K_r\left(\beta - \frac{L_r}{V}r\right)L_r + M - I_{r'}\right\} \quad \text{Eq. 5}$$

In addition, the sideslip angle differential value computing unit 42 calculates the vehicle body sideslip angle differential value β' by substituting the front wheel cornering power $K_f$ calculated using equation 5, the determined rear wheel cornering power $K_r$; and the constant vehicle speed V, the yaw rate r, the front wheel steering angle δ, the distance $L_f$ from the center of gravity of the vehicle to the front wheel axle, the distance $L_r$ from the center of gravity of the vehicle to the rear wheel axle, and the total mass of the vehicle m into the following equation 6, which is an equation obtained by solving 2 to obtain the vehicle body sideslip angle differential value β'. Here, the calculated vehicle body sideslip angel differential value β' is input into the integrator 43 and the lateral acceleration estimating unit 44.

$$\beta' = \frac{-2(K_f + K_r)}{mV}\beta + \left\{\frac{-2(K_f L_f - K_r L_r)}{mV^2} - 1\right\}r + \frac{2K_f}{mV}\delta \quad \text{Eq. 6}$$

The integrator 43 calculates the vehicle body sideslip angle β by integrating with respect to time the vehicle body sideslip angle differential value β' input from the sideslip angle differential value computing unit 42, and the result is input into the target distributed torque setting apparatus 21 and the sideslip angle differential value computing unit 42. That is, the vehicle body sideslip angle β calculated here is used in the calculation of the vehicle body sideslip angle differential value β' in the next computation process in the sideslip angle differential value computing unit 42.

The lateral acceleration estimating unit 44 calculates the estimated lateral acceleration $G_{ye}$ of the vehicle by substituting the vehicle body sideslip angle differential value β', and the constant vehicle speed V and yaw rate r into equation 4, and inputting the result the subtractor 45.

The subtractor 45 calculates the deviation between the lateral acceleration $G_y$ input by the lateral acceleration sensor 12 and the estimated lateral acceleration $G_{ye}$ of the vehicle input by the lateral velocity estimating unit 44, and outputs the result to the PID regulator 46.

The PID regulator 46 calculates the regulating value that makes the deviation between the lateral acceleration $G_y$ and the estimated lateral acceleration $G_{ye}$ of the vehicle zero, that is, the regulating value for regulating the predetermined initial value of either the front wheel cornering power $K_f$ or the rear wheel cornering power $K_r$ output by the cornering power initial value input unit 41 and input by the sideslip angle differential value computing unit 42, and inputs the result into the adder 47.

That is, if the predetermined initial value of either the front wheel cornering power $K_f$ or the rear wheel cornering power $K_r$ input to the sideslip angle differential value computing unit 42 is an appropriate value, the deviation between the lateral acceleration $G_y$ and the estimated lateral acceleration $G_{ye}$ of the vehicle will be zero.

Thereby, in the case, for example, that the estimated lateral acceleration $G_{ye}$ of the vehicle is larger than the detected lateral acceleration $G_y$, the regulating value is set so as to make either the front wheel cornering power $K_f$ or the rear wheel cornering power $K_r$ input to the sideslip angle differential computing unit 42 smaller. In contrast, in the case, for example, that the estimated lateral acceleration $G_{ye}$ of the vehicle is smaller than the detected lateral acceleration $G_y$, the regulating value is set so as to make either the front wheel cornering power $K_f$ or the rear wheel cornering power $K_r$ input to the sideslip angle differential computing unit 42 larger.

The vehicle control system 10 according to the present embodiment is comprises the structure described above. Next, as shown in FIGS. 9A and 9B, the operation of this vehicle control system 10 will be explained in particular for a process in which the vehicle body sideslip angle β is estimated as the quantity that represents the state of the vehicle.

First, in step S 01, the rear wheel cornering power $K_r$ input to the sideslip angle differential value computing unit 42 is calculated by using the predetermined initial value of the rear wheel cornering power $K_r$ input from the cornering power initial value input unit 41 and the regulating value input from the PID regulator 46. Moreover, in the first computation, the regulating value is zero.

Next, in step S 02, the front wheel cornering power $K_f$ is calculated by the above equation 5 based on the results of detected quantities output from each of the sensors 11, 13, and 14, the physical quantities set in advance, and the like.

Next, in step S 03, the vehicle body sideslip angle differential value β' is calculated using the above equation 6.

Then in step S 04, the vehicle body sideslip angle β is calculated by integrating with respect to time the vehicle body sideslip angle differential value β', and this vehicle body sideslip angle differential value β' is used in the calculation of the front wheel cornering power $K_f$ in the above step S 02 and the calculation of the vehicle body sideslip angle differential value β' in the next sequence of computing processing.

Then in step S 05, the estimated lateral acceleration $G_{ye}$ of the vehicle is calculated using the above equation 4 based on the vehicle body sideslip angle differential value β', the yaw rate r of the vehicle detected by the yaw rate sensor 11, and the vehicle speed V detected by the vehicle speed sensor 13.

Next, in step S 06, the deviation between the lateral acceleration $G_y$ input by the lateral acceleration sensor 12 and the estimated lateral acceleration $G_{ye}$ of the vehicle input from the lateral acceleration estimating unit 44 is calculated.

Then in step S 07, due to the proportion, integration, differential (PID) operation, the regulating value of the predetermined initial value of the rear wheel cornering power $K_r$ is set so that the deviation between the lateral acceleration $G_y$ and the estimated lateral acceleration $G_{ye}$ of the vehicle is zero.

In addition, in step S 08, the rear wheel cornering power $K_r$ input into the sideslip angle differential value computing unit 42 is updated by the regulating value computed in step S 07 and the predetermined initial value of the rear wheel cornering power $K_r$ input by the cornering power initial value input unit 41, the processing returns to the above step S 02, and the processing of step S 02 and after is executed, for example, after a predetermined time interval.

Specifically, based on the above equations 4 to 6, the deviation between the lateral acceleration $G_y$ and the estimated lateral acceleration $G_{ye}$ of the vehicle converges to a value near zero due to executing the above sequence processing at each predetermined time interval, and along with the vehicle body sideslip angle β, the front wheel cornering power $K_f$ and the rear wheel cornering power $K_r$ can be estimated with high precision.

Moreover, in this embodiment, the flow of the processing is not limited to that shown in FIG. 4. Other methods can be used, and basically any processing that calculates a vehicle body sideslip angle β, a front wheel cornering power $K_f$, and the rear wheel cornering power $K_r$ that simultaneously satisfy the above equations 4 to 6 is satisfactory.

As described above, according to the method of estimating the quantities that represent the state of a vehicle in the present embodiment, by calculating the vehicle body sideslip angle β from three unknowns, the vehicle body sideslip angle β, the front wheel cornering power $K_f$, and the rear wheel cornering power $K_r$, using three equations, equation 2, which is an equation of balance for the force in the lateral direction of the vehicle, equation 3, which is the equation of balance for the moment around a vertical axis of the vehicle, and the equation 4, which is an equation representing the physical relationship of the quantities that represent the state of the vehicle movement, the vehicle body sideslip angle β is a simple method that limits increases in the computation load and at the same time has high precision.

That is, compared to directly integrating the result of the detected quantities that include errors in the lateral acceleration $G_y$ output by the lateral acceleration sensor 12 or the like, as is the case with the example of conventional technology described above, increases in the accumulated error can be limited.

In addition, in the process of estimating the vehicle sideslip angle β, the front wheel cornering power $K_f$ and the rear wheel cornering power $K_r$, which serve as variables that determine the characteristics of the front wheel and rear wheel tires, can be estimated with high precision, and, for example, depending on changes in the road surface during travel or the like, even in the case that the characteristics of each of the tires change, it is possible to prevent a deterioration in the precision of the estimation of the vehicle body sideslip angle β.

Here, when calculating the vehicle body sideslip angle differential value β', due to carrying out a recursive calculation processing by using the vehicle sideslip angle B calculated in the previous processing, it is possible to prevent the vehicle body sideslip angle β obtained by integrating with respect to time the vehicle body sideslip angle differential value β' from diverging.

That is, by repeating a recursive calculating processing, due to the vehicle body sideslip angle β converging, it is possible to prevent the estimated value of the vehicle body sideslip angle β from fluctuating drastically, and it is possible to guarantee the stability of the vehicle behavior control.

Furthermore, depending, for example, on the changes in the road surface or the like, even in the case that the front wheel cornering power $K_f$ or the rear wheel cornering power $K_r$ fluctuate drastically, the physical quantity obtained by the process of estimating the vehicle body sideslip angle β, that is, the regulating value that makes the deviation between the estimated lateral acceleration $G_{ye}$ of the vehicle and the lateral acceleration $G_y$ actually detected zero, is set for the front wheel cornering power $K_f$ or the rear wheel cornering power $K_r$, and thereby an appropriate vehicle body sideslip angle β can be calculated.

Furthermore, because the estimated lateral acceleration $G_{ye}$, which is compared to the detected lateral acceleration $G_y$, is calculated based on the vehicle body sideslip differential value β', compared to the case of using the physical quantities calculated based on the vehicle body sideslip angle β, which are obtained by integrating with respect to time the vehicle body sideslip angle differential value β', it is possible to prevent the errors due to the integration computation in variables that are the object of testing from accumulating, and it is possible to execute testing that has high precision.

Figure 5:
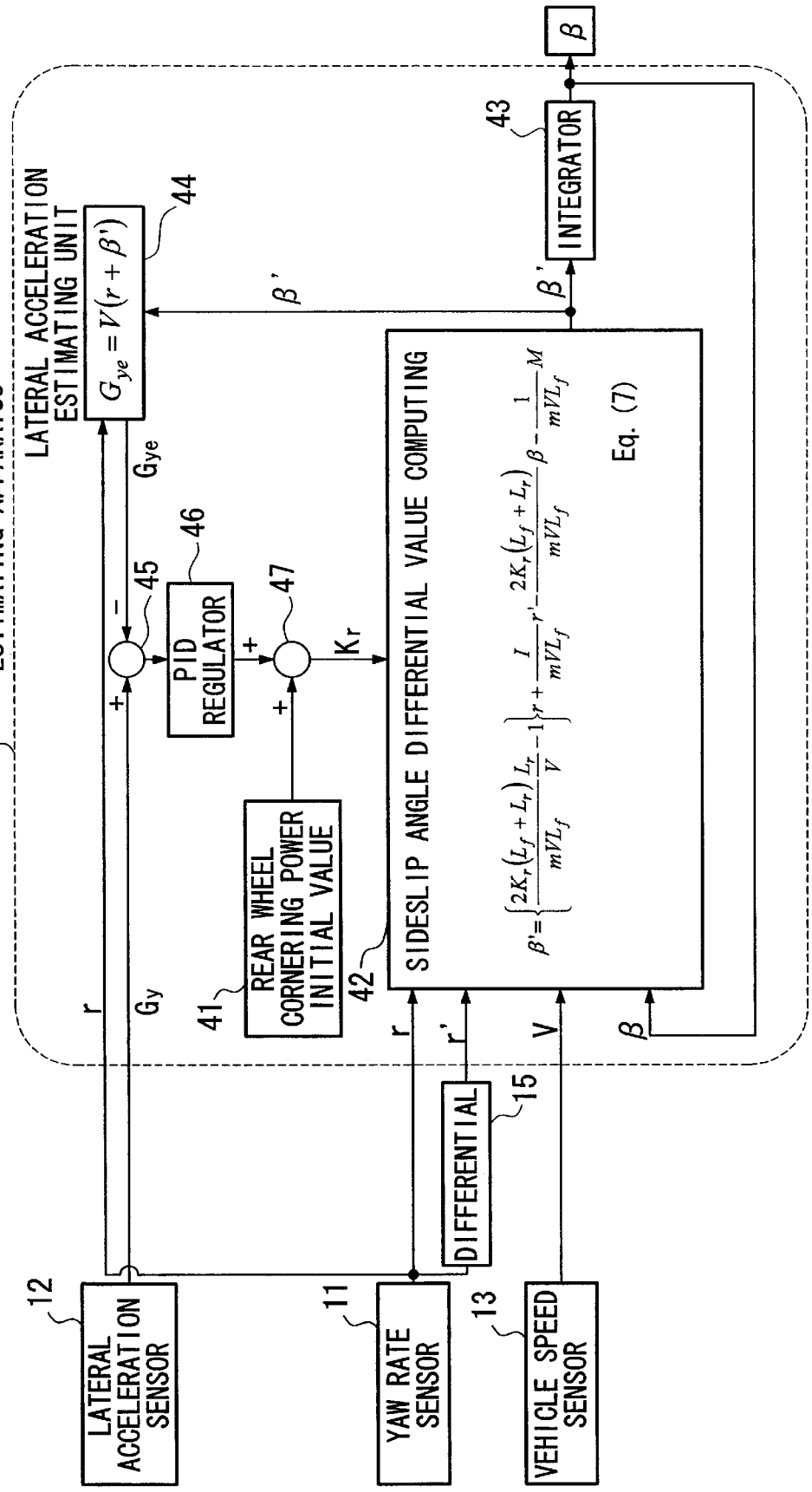
FIG. 5 is a block diagram according to a first modification showing an example of the flow of the processing in the vehicle body sideslip angle estimating apparatus shown in FIG. 1 and FIG. 2.

Next, the method of estimating the quantities that represent the vehicle state according to a second modification of the present embodiment described above will be explained with reference to the attached figures. FIG. 5 is a functional block diagram showing the flow of processing according to a second modification of the vehicle body sideslip angle estimating apparatus 20 shown in FIG. 1 and FIG. 2.

Moreover, below the explanation of the parts that are identical to those of the embodiment described above are abbreviated or omitted.

The major point of difference between this first modification and the embodiment described above is the content of the computing processing for the sideslip angle differential value computing unit 42. Here, when calculating the vehicle body sideslip angle β, the front wheel steering angle δ is not necessary, and thus the front wheel steering angle sensor 14 can be omitted.

Specifically, the sideslip angle differential value computing unit 42 according to this first modification calculates the vehicle body sideslip angle differential value β' by substituting the rear wheel cornering power $K_r$ input from the cornering power setting unit 41; the constants vehicle speed V, yaw rate r, yaw rate differential value r', the distance $L_f$ from the center of gravity of the vehicle to the front wheel axle, the distance $L_r$ from the center or gravity of the vehicle to the rear wheel axle, the yawing inertial moment I, the yawing moment M, and the total mass of the vehicle; and the vehicle body sideslip angle β input from the integrator 43 into the following equation 7, which is an equation obtained by eliminating the front wheel cornering power $K_f$ from the above equations 2 and 3 and solved to obtain the vehicle body sideslip angle differential angle value β'.

$$\beta' = \left\{\frac{2K_r(L_f+L_r)}{mVL_f}\frac{L_r}{V}-1\right\}r + \frac{I}{mVL_f}r' - \frac{2K_r(L_f+L_r)}{mVL_f}\beta - \frac{1}{mVL_f}M \quad \text{Eq. 7}$$

Thereby, in the sequence of processing in steps S 01 to step S 08 in the embodiment described above, step S 02 can be omitted, and in step S 03, the vehicle body sideslip angle differential value β is calculated by the above equation 7.

Specifically, in this first modification, based on the above equations 4 and 7, the deviation between the lateral acceleration $G_y$ and the estimated lateral acceleration $G_{ye}$ of the vehicle converges to a value near zero, and thereby, along with the vehicle body sideslip angle β, it is possible to estimate the rear wheel cornering power $K_r$ with high precision.

Moreover, in this first modification, the flow of the processing shown in FIG. 5 is not limiting. Other processing can be used, and basically processing that calculates a vehicle body sideslip angle β and a rear wheel cornering power $K_r$ that simultaneously satisfy the above equations 4 and 7 is satisfactory.

As described above, according to the method of estimating the quantities that represent the state of the vehicle in the first modification of the present embodiment, the front wheel steering angle δ is unnecessary and the front wheel steering angle sensor 14 can be eliminated. Without lowering the precision of the estimation of the vehicle body sideslip angle β, it is possible to further simplify the structure and computing processing of the vehicle control system 10.

Figure 6:
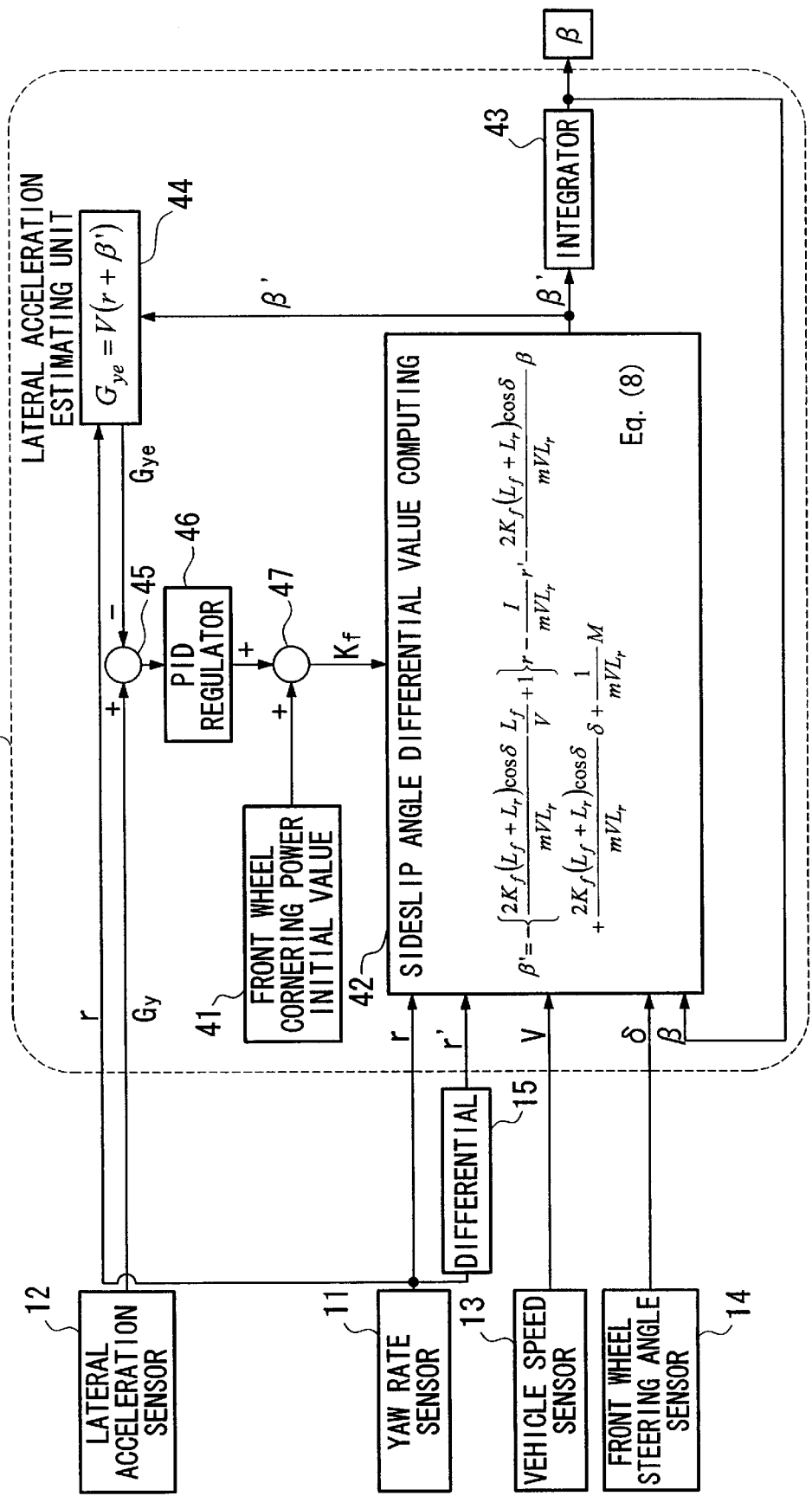
FIG. 6 is a block diagram according to a second modification showing an example of the flow of the processing in the vehicle body sideslip angle estimating apparatus shown in FIG. 1 and FIG. 2.

Next, the method of estimating the quantities that represent the vehicle state according to a second modification of the present embodiment described above will be explained with reference to the attached figures. FIG. 6 is a functional block diagram showing the flow of processing according to a second modification of the vehicle body sideslip angle estimating apparatus 20 shown in FIG. 1 and FIG. 2.

Moreover, below the explanation of the parts that are identical to those of the embodiment described above are abbreviated or omitted.

In this second modification, the major point of difference with the embodiment described above is the contents of the computing processing in the sideslip angle differential value computing unit 42. Here, when calculating the vehicle body sideslip angle β, instead of the rear wheel cornering power $K_r$, the vehicle body sideslip angle differential value β' is calculated based on the front wheel cornering power $K_f$, which is determined by the initial value of the front wheel cornering power $K_f$ input by the cornering power initial value input unit 41 and the regulation value output by the PID regulator 46.

That is, the sideslip angle differential value computing unit 42 according to this second modification calculates the vehicle body sideslip angle differential value β' by substituting the determined front wheel cornering power $K_f$; the constants vehicle speed V, the yaw rate r, the yaw rate differential value r', the front wheel steering angle δ, the distance $L_f$ from the center of gravity of the vehicle to the front wheel axle, the distance $L_r$ from the center of gravity of the vehicle to the rear wheel axle, the yawing inertial moment I, the yawing moment M, the total mass m of the vehicle; and the vehicle body sideslip angle β into the following equation 8, which is an equation obtained by eliminating the rear wheel cornering power $K_r$ from the above equation 2, and is solved for the vehicle body sideslip angle differential value β'.

$$\beta' = -\left\{\frac{2K_f(L_f+L_r)\cos\delta}{mVL_r}\frac{L_f}{V}-1\right\}r - \frac{I}{mVL_r}r' - \frac{2K_f(L_f+L_r)\cos\delta}{mVL_r}\beta + \frac{2K_f(L_f+L_r)\cos\delta}{mVL_r} + \frac{1}{mVL_r}M \quad \text{Eq. 8}$$

Thereby, in this second modification, in the sequence of processing from step S 01 to step S 08 in the embodiment described above, in step S 01, the front wheel cornering power $K_f$ input into the sideslip angle differential value computing unit 42 is calculated using the predetermined initial value of the front wheel cornering power $K_f$ input by the cornering power initial value input unit 41 and the regulating value input from the PID regulator 46. Furthermore, in addition to with omitting step SS 02, in step S 03, the vehicle body sideslip angle differential value β' is calculated using the above equation 8.

In addition, in step S 07, due to the proportion, integration, and differential (PID) operation, the regulating value is set with respect to the predetermined initial value of the front wheel cornering power $K_f$ such that the deviation between the lateral acceleration $G_y$ and the estimated lateral acceleration $G_{ye}$ of the vehicle becomes zero.

In addition, in step S 08, the front wheel cornering power $K_f$ input into the sideslip angle differential value computing unit 42 is updated, the processing returns to the above step S 03, and the processing of step S 03 and after is executed, for example, after a predetermined time interval.

That is, in this second modification, based on the above equations 4 and 8, the deviation between the lateral acceleration $G_y$ and the estimated lateral acceleration $G_{ye}$ of the vehicle are made to converge on a value near zero, and thereby along with the vehicle body sideslip angle β, the front wheel cornering power $K_f$ can be estimated with high precision.

Moreover, in this second modification, the flow of processing shown in FIG. 6 is not limiting. Another method can be used, and basically processing that calculates a vehicle body sideslip angle β and a front wheel cornering power $K_f$ that simultaneously satisfy the above equations 4 and 8 is satisfactory.

Figure 7:
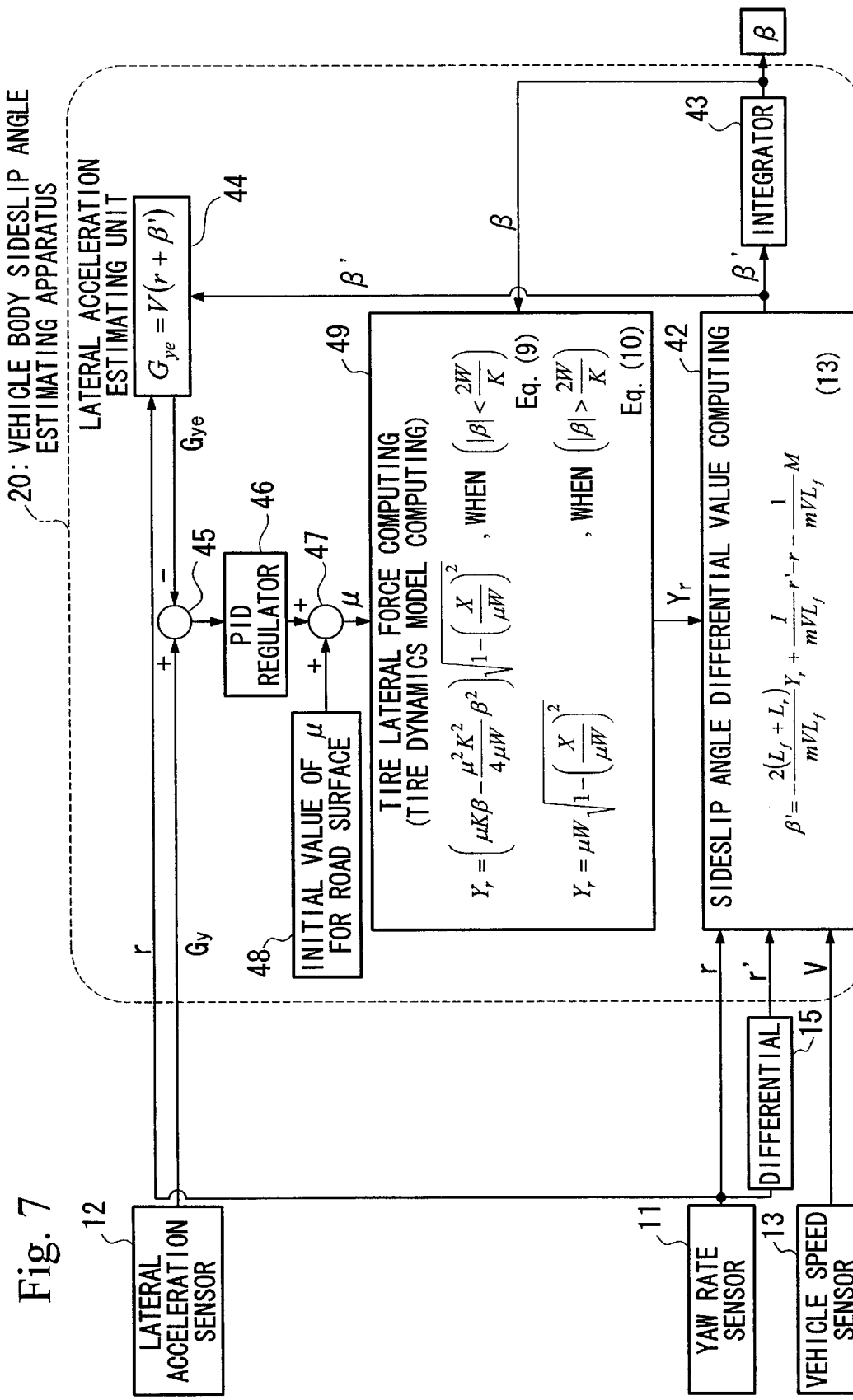
FIG. 7 is a block diagram according to a third modification showing an example of the flow of the processing in the vehicle body sideslip angle estimating apparatus shown in FIG. 1 and FIG. 2.

Next, a method of estimating the quantities that represent the state of a vehicle according to a third modification of the present embodiment will be explained with reference to the figures. FIG. 7 is a functional block diagram showing the flow of processing according to the third modification of the vehicle body sideslip angle estimating apparatus 20 shown in FIG. 1 and FIG. 2.

Moreover, below, the explanation of parts identical to those of the embodiment described above has been simplified or omitted.

In the third modification, the equation of equilibrium of the force of the vehicle in the lateral direction and the equation of equilibrium for the moment of the vehicle around the vertical axis is represented based on the lateral force $Y_f$ that acts on the front wheels WF (that is, each of the wheels $W_{FR}$ and $W_{FL}$) and the lateral force $Y_r$ that acts on the rear wheels WR (that is, each of the wheels $W_{RR}$ and $W_{RB}$). In addition, by using a predetermined tire dynamics model described below, the lateral forces $Y_f$ and $Y_r$ are represented based on an equation related to the variables that determine the characteristics of the front wheel tires and the rear wheel tires (for example, the coefficient of friction μ between each of the tires and the road surface).

That is, the point of difference between the present embodiment described above and the third modification is that instead of each of the cornering powers $K_f$ and $K_r$ serving as variables, the coefficient of friction μ between each of the tires and the road surface serves as a variable, and the vehicle body sideslip angle differential value β' is calculated.

The vehicle body sideslip angle estimating apparatus 20 according to this third modification comprises a sideslip angle differential value computing unit 42, an integrator 44, a lateral acceleration estimating unit 44, a subtractor 45, a PID regulator 46, an adder 47, a tire characteristic variable input unit 48, and a tire lateral force computing unit 49.

That is, instead of the cornering power initial value input unit 41 in the embodiment described above, the tire characteristic variable input unit 48 inputs the initial value of the variables (for example, the coefficient of friction μ between each of the tires and the road surface) that determine the characteristics of the front tires and rear tires.

The PID regulator 46 calculates the regulation value for regulating the initial value of the coefficient of friction μ such that the deviation between the lateral acceleration $G_y$ and the estimated lateral acceleration $G_{ye}$ of the vehicle becomes zero due to the proportion, integration, differential (PID) operation, and inputs the result into the adder 47.

The adder 47 calculates the coefficient of friction μ input into the tire lateral force computing unit 49 by the predetermined initial value of the coefficient of friction μ input by the tire characteristic variable input unit 48 and the regulating value input by the PID regulator 46.

The tire lateral force computing unit 49 calculates the lateral force $Y_r$ applied to the rear wheel tires based on the following equations 6 and 7 derived, for example, from a predetermined tire dynamics model, and outputs the result to the sideslip angle differential value computing unit 42.

$$Y_r = \left( \mu K \beta - \frac{\mu^2 K^2}{4\mu W} \beta^2 \right) \sqrt{1 - \left(\frac{X}{\mu W}\right)^2}, \left(|\beta| < \frac{2W}{K}\right) \qquad \text{Eq. 9}$$

$$Y_r = \mu W \sqrt{1 - \left(\frac{X}{\mu W}\right)^2}, \left(|\beta| > \frac{2W}{K}\right) \qquad \text{Eq. 10}$$

Here, in the above equations 9 and 10, the ground load W is a value found from the value that is the measured value of the vehicle load corrected by the longitudinal and lateral acceleration, or the output of the load cell provided on the suspension system, and the cornering power K is the value found from a predetermined map set in advance, comprising, for example, preset and predetermined maps of the cornering power, which changes depending on the coefficient of friction μ, the ground load W, or the like. Furthermore, the longitudinal force X is a value estimated from the acceleration (or deceleration) or the like, or, for example, found from the damping hydraulic pressure or the engine output. In addition, the vehicle body sideslip angle β is a value input from the integrator 43, and is zero in the first computation. Depending on the value of this vehicle body sideslip angle β, the lateral force $Y_r$ that is applied to the rear wheel tires is calculated by one of either of the above equations 9 or 10.

The sideslip angle differential value computing unit 42 according to this third modification calculates the vehicle body sideslip angle differential value β' by using the following equation 13, in which the equation obtained by eliminating the lateral force $Y_f$ applied, for example, to the front wheels WF, and solved to obtain the vehicle body sideslip angle differential value β', based on the following equations 11 and 12 obtained when representing the equation of equilibrium for the force in the lateral direction of the vehicle and the equation of equilibrium of the moment of the vehicle around the vertical axis based on the lateral force $Y_f$ applied to the front wheel tires and the lateral force $Y_r$ applied to the rear wheel tires.

Specifically, in the following equation 13, the physical quantities that can be directly measured are the vehicle speed V, the yaw rate r, and the yaw rate differential value r', and the constant physical quantities of the vehicle are the total mass of the vehicle m, the distance $L_f$ from the center of gravity of the vehicle to the front wheel axle, and distance $L_r$ from the center of gravity of the vehicle to the rear wheel axle, and the yawing inertial moment I. These values and the already known yawing moment M are treated as constants, and the vehicle body sideslip angle differential value β' is calculated by using the lateral force $Y_r$ input from the tire lateral force computing unit 49.

$$mV(r+\beta') = -2Y_f - 2Y_r \qquad \text{Eq. 11}$$

$$Ir' = -2Y_f L_f + 2Y_r L_r + M \qquad \text{Eq. 12}$$

$$\beta' = -\frac{2(L_f + L_r)}{mVL_f}Y_r + \frac{I}{mVL_f}r' - r - \frac{1}{mVL_f}M \qquad \text{Eq. 13}$$

Thus, in this third modification, in the sequence of processing of step S 01 to step S 08 in the embodiment described above, in step S 01, a coefficient of friction $\mu$ input to the tire lateral force computing unit 49 is calculated using a predetermined initial value (for example, the value of a first approximation or the like) of the coefficient of friction $\mu$ input from the tire characteristic variable input unit 48 and the regulating value input from the PID regulator 46.

Then in step S 02, the lateral force $Y_r$ acting on the rear wheels WR is calculated by the above equations 9 and 10.

Next, in step S 02, the vehicle body sideslip angle differential value $\beta'$ is calculated by the above equation 13.

Next, in step S 03, the vehicle body sideslip angle $\beta$ is calculated by integrating with respect to time the vehicle body sideslip angle differential value $\beta'$, and this vehicle body sideslip angle $\beta$ is used in the calculation of the lateral force $Y_r$ applied to the rear wheels WR in the above step S 01 in the next sequence of computation processing.

In addition, in step S 07, the regulating value for the predetermined initial value of the coefficient of friction $\mu$ is set so that the deviation between the lateral acceleration $G_y$ and the estimated lateral acceleration $G_{ye}$ of the vehicle become zero due to the proportion, integration, differential (PI) operation.

Then in step S 08, the coefficient of friction $\mu$ input into the tire lateral force computing unit 49 is updated, the processing returns to step S 02, and the processing after step S 02 is executed, for example, after a predetermined time interval.

That is, in this third modification, based on the above equations 4 and 13, the deviation between the lateral acceleration $G_y$ and the estimated lateral acceleration $G_{ye}$ of the vehicle converge on a value near zero, and thereby, along with the vehicle body sideslip angle $\beta$, the coefficient of friction $\mu$ can be estimated with a high precision.

Moreover, in this third modification, the flow of processing in FIG. 7 is not limiting. Other methods can be used, and basically any method that calculates a vehicle body sideslip angel $\beta$ and a coefficient of friction $\mu$ that simultaneously satisfy the above equations 4 and 13 is sufficient.

In addition, in this third modification, without varying the ground load W and the longitudinal force X, a different tire dynamics model that describes the lateral forces $Y_f$ and $Y_r$ can be applied.

In addition, in the sideslip angle differential value calculating unit 42 of this third modification, like equation 5 in the embodiment described above, the lateral force $Y_f$ acting on to the front wheels WF is calculated by substituting the lateral force $Y_r$ applied to the rear wheel tires based on the above equations 9 and 10 derived from a dire dynamics model into the equation obtained by solving the above equation 12, which is the equation of equilibrium for the moment of a vehicle around the vertical axis, for the lateral force $Y_f$ acting on the front wheels WF. In addition, like equation 6 in the embodiment described above, the vehicle body sideslip angle differential value $\beta'$ can be calculated by substituting each of the lateral forces $Y_r$ and $Y_f$ into an equation obtained by solving the equation of equilibrium for the force in the lateral direction of the vehicle for the vehicle body sideslip angle differential value $\beta'$.

In addition, in this third modification, the lateral force $Y_r$ acting on the rear wheel tires is calculated by the tire lateral force computing unit 49, and the vehicle body sideslip angle differential value $\beta'$ is calculated based on the lateral force $Y_r$ acting on the rear wheel tires is calculated by the sideslip angle differential value computing unit 42, this is not limiting. For example, the lateral force $Y_f$ acting on the front wheel tires can be calculated by the tire lateral force computing unit 49 and the vehicle body sideslip angle differential value $\beta'$ can be calculated using an equation obtained by eliminating the lateral force $Y_r$ acting on the rear wheel tires from the above equations 11 and 12 and solved for the vehicle body sideslip angle differential value $\beta'$.

As described above, according to the method of estimating qualities that represent the state of a vehicle according to the third modification of the present embodiment, the variables that determine the characteristics of the front wheel and rear wheel tires are not limited to the front wheel cornering power $K_f$ and the rear wheel corning power $K_r$, but depending on the control content of the vehicle, for example, it is possible to use appropriate variables such as the coefficient of friction $\mu$ between each of the tires and the road surface, and it is possible to diversify the control equations of the vehicle easily.

Furthermore, it is possible to introduce a tire dynamics model according to either one of the rear wheel tires or the front wheel tires, and compared to the case of introducing a tire dynamics model for both the rear wheel tires and the front wheel tires, the deterioration of the precision of the estimation that originate in the modeling can be limited.

Moreover, in the present embodiment described above and the first through third modifications thereof, as shown, for example, in the following equation 14, the vehicle body sideslip angle $\beta$ can be represented by the $V_x$ component of the vehicle speed V in the direction of the lateral axis P and the $V_y$ component perpendicular thereto in the lateral direction. Furthermore, the above equations 2 and 3 can be replaced with the following equations 15 and 16 using an approximation when the vehicle body sideslip angle $\beta$ is sufficiently small (for example, $V=V_x$). Thereby, the $V_y$ component of the vehicle speed V in the lateral direction can be estimated as the quantity representing the state of the vehicle instead of the vehicle body sideslip angle $\beta$.

Moreover, in this case, the speed of the rear wheels WR in the two-wheel model can approximate the $V_x$ component of the vehicle speed in the direction of the longitudinal axis P.

$$\beta = \mathrm{atan}\left(\frac{V_y}{V_x}\right) \qquad \text{Eq. 14}$$

$$m(V'_y + rV_x) = -2K_f\left\{\mathrm{atan}\left(\frac{V_y + L_f r}{V_x}\right) - \delta\right\} - 2K_r\left\{\mathrm{atan}\left(\frac{V_y + L_f r}{V_x}\right)\right\} \qquad \text{Eq. 15}$$

$$Ir' = \qquad \text{Eq. 16}$$
$$-2K_f\left\{\mathrm{atan}\left(\frac{V_y + L_f r}{V_x}\right) - \delta\right\}L_f + 2K_r\left\{\mathrm{atan}\left(\frac{V_y - L_f r}{V_x}\right)\right\}L_r + M$$

Figure 8:
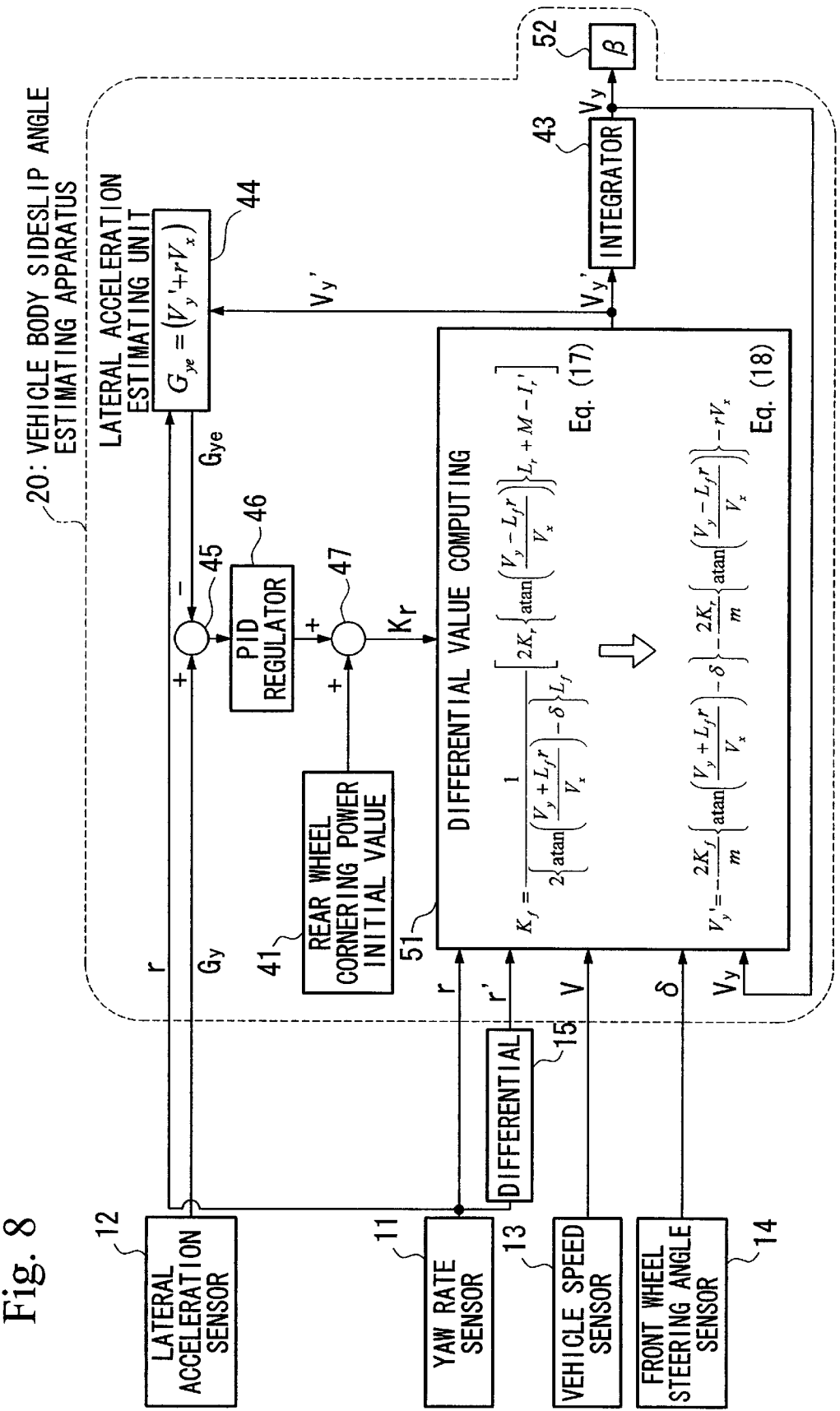
FIG. 8 is a block diagram according to a fourth modification showing an example of the flow of the processing in the vehicle body sideslip angle estimating apparatus shown in FIG. 1 and FIG. 2.

For example, in the vehicle body sideslip angle estimating apparatus 20 according to a fourth modification of the present embodiment described above, as shown in FIG. 8, a differential value computing unit 51 is provided instead of the sideslip angle differential value computing unit 42, and in this differential value computing unit 51, first the front wheel cornering power $K_f$ is calculated based on the following equation 17, in which the above equation 16 is solved to obtain the front wheel cornering power $K_f$. In addition, the differential value $V_y'$ is estimated based on the following equation 18, in which the above equation 15 is solved to obtain the differential value $dV_y/dt$ (that is, the time differential value of the $V_y$ component in the lateral direction: $V_y'$) of the $V_y$ component of the vehicle speed V in the lateral direction, and the result is input to the integrator 43.

$$K_f = \frac{1}{2\left\{\operatorname{atan}\left(\frac{V_y + L_f r}{V_x}\right) - \delta\right\} L_f} \left[2K_r\left\{\operatorname{atan}\left(\frac{V_y - L_f r}{V_x}\right)\right\} L_r + M - I_r\right] \quad \text{Eq. 17}$$

$$V_y' = -\frac{2K_f}{m}\left\{\operatorname{atan}\left(\frac{V_y + L_f r}{V_x}\right) - \delta\right\} - \frac{2K_r}{m}\left\{\operatorname{atan}\left(\frac{V_y - L_f r}{V_x}\right)\right\} - rV_x \quad \text{Eq. 18}$$

Here, the integrator 43 calculates the $V_y$ component in the lateral direction by integrating with respect to time the differential value $V_y'$, and at the same time, the $V_y$ component in the lateral direction calculated here is used in the calculation of the differential value $V_y'$ in the next computing processing by the differential value computing unit 51.

In addition, the vehicle body sideslip angle calculating unit 52 provided in the vehicle body sideslip angle estimating apparatus 20 calculates the vehicle body sideslip angle β using the above equation 14 based on the $V_y$ component in the lateral direction calculated by the integrator 43.

In addition, the lateral acceleration estimating unit 44 calculates the estimated lateral acceleration $G_{ye}$ of the vehicle by substituting the differential value $V_y'$ input by the differential value computing unit and the constants, the $V_x$ component of the vehicle speed in the direction of the longitudinal axis P, and the yaw rate r into the following equation 19.

$$G_{ye} = (V_y' + rV_x) \quad \text{Eq. 19}$$

Thereby, in this fourth modification, in the sequence of processing of steps S 01 to S 08 in the embodiment described above, in step S 01, the rear wheel cornering power $K_r$ input into the differential value computing unit 51 is calculated. Next, in step S 02, the front wheel cornering power $K_r$ is calculated using the above equation 17.

Next, in step S 03, the differential value $V_y'$ is calculated using the above equation 18.

Next, in step S 04, the $V_y$ component in the lateral direction is calculated by integrating with respect to time the differential value $V_y'$, and the $V_y$ component in the lateral direction is used in the calculation of the differential value $V_y'$ in the above step S 03 in the next sequence of computation processing. At the same time, the vehicle body sideslip angle β is calculated using the above equation 14.

Then in step S 05, the estimated lateral acceleration $G_{ye}$ is calculated using the above equation 19.

In addition, in step S 08, the rear wheel cornering power $K_r$ is updated using the regulating value calculated in step S 07 and the predetermined initial value of the rear wheel cornering power $K_r$ input by the cornering power initial value input unit 41, the processing returns to the above step S 02, and the processing after step S 02 is executed, for example, after a predetermined time interval.

Moreover, in the first through fourth modifications of the present embodiment described above, the desired yawing moment M was applied to the vehicle by applying the appropriate drive power or braking force to each of the wheels $W_{FR}$, $W_{FL}$, $W_{RR}$, $W_{RL}$, but this is not limiting. For example, the yawing moment M can be omitted.

In addition, in the present embodiment and the first through fourth modifications of the present embodiment described above, as shown in FIG. 3, only a vehicle in which the steering angle of the rear wheels WR is zero and only the front vehicle wheels $W_{FR}$ and $W_{FL}$ are steered was the object of the invention, but this is not limiting. For example, a rear wheel steering angle sensor that detects the rear wheel steering angle (that is, the angle between the longitudinal axis P of the vehicle and the longitudinal direction QR of the rear wheels) can be provided, and the vehicle body sideslip angle β can be calculated based on an equation of equilibrium of the force in the lateral direction of the vehicle and an equation of equilibrium of the moment of the vehicle around the vertical axis that include the rear steering angle can be calculated. In this case, a four-wheel drive vehicle can be an object of the present invention.

In addition, in the present embodiment described above and the second and fourth modifications, the front wheel steering angle sensor 14 detects the front wheel steering angle δ by dividing the steering angle, which comprises the direction and size of the steering angle input by the driver, by the steering gear ratio of the front wheel steering system, but this is not limiting. For example, the front wheel steering angle δ can be directly detected.

In addition, in the present embodiment and the first through fourth modifications described above, the PID regulator 46 sets the regulating value so that the deviation between the lateral acceleration $G_y$ and the estimated lateral acceleration $G_{ye}$ as the quantities that represent the state of the vehicle movement becomes zero, but this is not limiting. For example, the regulating value can be set so that the ratio between the lateral acceleration $G_y$ and the estimated lateral acceleration $G_{ye}$ of the vehicle is '1'. In other words, the regulating value can be set such that the lateral acceleration $G_y$ and the estimated lateral acceleration $G_{ye}$ of the vehicle become equal. Furthermore, instead of comparing the lateral acceleration $G_y$ and the estimated lateral acceleration $G_{ye}$ of the vehicle, other quantities that represent the state of the vehicle movement that satisfy the above equation 4 can be compared.

In addition, in the present embodiment and the first through fourth modifications described above, feedback control is carried out such that the deviation between the lateral acceleration $G_y$ and the estimated lateral acceleration $G_{ye}$ of the vehicle converges on zero, but this is not limiting. For example, any appropriate control can be carried out such that the deviation converges on zero.

In addition, for example, it is also possible to prevent the accumulation of error by carrying out pseudo-integration by inputting to a pseudo-integrator the deviation between the lateral acceleration $G_y$ and the estimated lateral acceleration $G_{ye}$ depending on the state of the turning movement of the vehicle or the like.

As explained above, according to a first aspect of the method of estimating the quantities that represent the state of a vehicle, the vehicle body sideslip angle can be calculated using a simple method that limits the increase in the computing load and at the same time has a high precision by using simultaneous equations with three unknowns, the vehicle body sideslip, the front wheel cornering power, and the rear wheel cornering power, or specifically, by using three equations, the equation of equilibrium for the force in the lateral direction of the vehicle, the equation of equilibrium for the moment of the vehicle around the vertical axis, and the equation for the physical relationships of the quantities that represent the state of the vehicle movement.

In addition, according to the second aspect of the method of estimating the quantities that represent the state of a vehicle of the present invention, the vehicle body sideslip angle can be calculated using a simple method that limits the increase in the computing load and at the same time has a high precision by using simultaneous equations with three unknowns, the speed of the vehicle in the lateral direction, the front wheel cornering power, and the rear wheel cornering power, or specifically, by using three equations, the equation of equilibrium for the force in the lateral direction of the vehicle, the equation of equilibrium for the moment of the vehicle around the vertical axis, and the equation for the physical relationships of the quantities that represent the state of the vehicle movement, in addition to an equation that unambiguously calculates the vehicle body sideslip angle from the speed of the vehicle in the lateral direction and the vehicle velocity.

In addition, according to a third aspect of the method of estimating the quantities that represent the state of a vehicle, the vehicle body sideslip angle can be calculated using a simple method that limits the increase in the computing load and at the same time has a high precision by using simultaneous equations with three unknowns, the vehicle body sideslip, the front wheel tires lateral force, and the rear wheel tires lateral force, or specifically, by using three equations, the equation of equilibrium for the force in the lateral direction of the vehicle, the equation of equilibrium for the moment of the vehicle around the vertical axis, and the equation for the physical relationships of the quantities that represent the state of the vehicle movement.

In addition, according to a fourth aspect of the method of estimating the quantities that represent the state of a vehicle, the vehicle body sideslip angle can be calculated using a simple method that limits the increase in the computing load and at the same time has a high precision by using simultaneous equations with three unknowns, the values related to the vehicle body sideslip, the variables that determine the characteristics of the front wheel tires, and the variables that determine the characterizes of the rear wheel tires, or specifically, by using three equations, the equation of equilibrium for the force in the lateral direction of the vehicle, the equation of equilibrium for the moment of the vehicle around the vertical axis, and the equation for the physical relationships of the quantities that represent the state of the vehicle movement.

Furthermore, according to a fifth aspect of the method of estimating the quantities that represent the state of a vehicle of the present invention, compared to the case of comparing the physical quantities calculated based on the vehicle body sideslip angle obtained by integrating with respect to time the differential value of the values related to the vehicle body sideslip angle, it is possible to prevent errors from accumulating due to the integration computations of variables that are the object of testing, and the testing can be executed with a high precision.

Furthermore, according to a sixth aspect of the method of estimating the quantities that represent the state of a vehicle of the present invention, when computing the differential value of the values related to the vehicle body sideslip angle, recursive calculation processing is carried out by using the values related to the vehicle body sideslip angle calculated in the previous processing, and thereby it is possible to prevent the values related to the vehicle body sideslip angle obtained by integrating with respect to time the differential values of the values related to the vehicle body sideslip angle from diverging. Thereby, drastic fluctuations in the estimated values of the values related to the vehicle body sideslip angle can be prevented, and the stability of the vehicle behavior control can be guaranteed.

Furthermore, according to a seventh aspect of the method of estimating the quantities that represent the state of a vehicle of the present invention, by estimating either the values related to the vehicle body sideslip angle, the variables that determine the characteristics of the front wheel tires, or the variables that determine the characteristics of the rear wheel tires, compared to the case, for example, of estimating three unknown variables, the computing load can be decreased.

Furthermore, according to an eighth aspect of the method of estimating the quantities that represent the state of a vehicle of the present invention, even in the case that the variables that determine the characteristics of the front wheel tires and the variables that determine the characteristics of the rear wheel tires fluctuate drastically depending, for example, on the changes in the road surface, the differential values of the values related to the vehicle body sideslip angle can be appropriately calculated.

What is claimed is:

1. A method of estimating quantities that represent the vehicle state of a vehicle comprises the steps of:
   detecting yaw rate, lateral acceleration and vehicle speed; and
   calculating a vehicle body sideslip angle using three equations, comprising a first equation of equilibrium for force in the lateral direction of the vehicle, a second equation of equilibrium for moment around a vertical axis of the vehicle, and a third equation for physical relationships of quantities that represent the state of vehicle movement, using a vehicle sideslip angle, a front wheel cornering power, and a rear wheel cornering power as unknown quantities.

2. A method of estimating quantities that represent the state of a vehicle comprises the steps of:
   detecting yaw rate, lateral acceleration, and vehicle speed;
   calculating a vehicle speed in the lateral direction from three simultaneous equations, comprising a first equation of equilibrium for the force in the lateral direction of the vehicle a second equation of equilibrium for moment around a vertical axis of the vehicle by representing vehicle lateral speed change as a ratio of vehicle speed, and a third equation for physical relationships of quantities that represent the state of vehicle movement, using a vehicle speed in the lateral direction, a front wheel cornering power, and a rear wheel cornering power as unknown quantities; and
   calculating vehicle body sideslip angle from said vehicle speed in the lateral direction.

3. A method of estimating quantities that represent the state of a vehicle comprising the steps of:
   detecting yaw rate, lateral acceleration, and vehicle speed; and
   calculating a vehicle body sideslip angle from three simultaneous equations, comprising a first equation of equilibrium for force in the lateral direction of the vehicle, a second equation of equilibrium for moment around a vertical axis of the vehicle by representing the lateral force difference applied to the front wheel and to the rear wheels, and a third equation for physical relationships of quantities that represent the state of vehicle movement, using a vehicle sideslip angle, a front wheel tire lateral force, and a rear wheel tire lateral force as unknown quantities.

4. A method of estimating quantities that represent the state of a vehicle comprising the steps of:
   detecting yaw rate, lateral acceleration, and vehicle speed; and
   calculating values related to vehicle sideslip angle from three simultaneous equations comprising a first equation of equilibrium for force in the lateral direction of the vehicle a second equation of equilibrium for moment around a vertical axis of the vehicle by substituting detected values of the yaw rate, the lateral acceleration, and the vehicle speed, and a third equation for physical relationships of quantities that represent the state of vehicle movement using a variable related to the vehicle sideslip angle, a variable that determines the characteristics of the front wheel tires, and a variable that determines the characteristics of the rear wheel tires, as unknowns.

5. The method of estimating the quantities that represent the state of the vehicle according to claim 4 further comprising the steps of:

calculating differential values of the values related to said vehicle sideslip angle based on said yaw rate and said vehicle speed; and testing the differential value of the values related to said vehicle body sideslip angle by said lateral acceleration.

6. The method of estimating the quantities that represent the state of a vehicle according to claim 5 further comprising the steps of:

calculating new values related to said vehicle sideslip angle by integrating the differential values of said values related to the vehicle sideslip angle; and calculating the differential values of said values related to the vehicle sideslip angle in the present processing by using said values related to the vehicle sideslip angle calculated in the previous processing.

7. The method of estimating the quantities that represent the state of a vehicle according to claim 4 further comprising the steps of:

eliminating one of said variable that determines the characteristics of the front wheel tires and said variable that determines the characteristics of the rear wheel tires from said first equation of equilibrium for the force in the lateral direction of the vehicle and said second equation of equilibrium for the moment around a vertical axis of the vehicle.

8. The method of estimating the quantities representing the state of a vehicle according to claim 7 further comprising the steps of:

calculating the differential values of said values related to the vehicle sideslip angle by providing initial values to said any variable that determines the characteristics of the front wheel tires or rear wheel tires that has not been eliminated;

calculating the lateral acceleration from the third equation for the physical relationships that represent said state of the vehicle movement using the differential values of said values related to the vehicle sideslip angle; and updating initial values based on results of comparing said calculated lateral acceleration and said detected lateral acceleration.

9. A method of estimating quantities that represent the vehicle state of a vehicle, comprising the steps of:

detecting yaw rate, lateral acceleration and vehicle speed; and calculating a vehicle body sideslip angle from three simultaneous equations, having vehicle sideslip angle, front wheel cornering power, and rear wheel cornering power as unknown quantities:

$$mV(r+\beta') = -2K_f\left(\beta + \frac{L_f}{V}r - \delta\right) - 2K_r\left(\beta - \frac{L_r}{V}r\right)$$

$$Ir' = -2K_f\left(\beta + \frac{L_f}{V}r - \delta\right)L_f + 2K_r\left(\beta - \frac{L_r}{V}r\right)L_r + M$$

$$G_{ye} = V(r+\beta')$$

wherein $\beta$ and $\beta'$ represent the sideslip angle and first differential ($d\beta/dt$) of the sideslip angle, m is a vehicle mass, V is a vehicle speed, r is a yaw rate, $K_r$ is cornering power of the front wheel, $L_f$ is distance between two front wheels, $\delta$ is an angle formed by the vehicle axis and the wheel direction (a steering angle), Kr is a cornering power of the rear wheel, Lr is a distance between two rear wheels, I is yawing moment of inertia, r is the yaw rate differential (dr/dt), M is yawing moment, and $G_{ye}$ is an estimated lateral acceleration of the vehicle.

* * * * *